United States Patent [19]
Nakamura

[11] Patent Number: 5,850,529
[45] Date of Patent: Dec. 15, 1998

[54] METHOD AND APPARATUS FOR DETECTING A RESOURCE LOCK ON A PCI BUS

[75] Inventor: Nobutaka Nakamura, Tokyo, Japan

[73] Assignee: Kabushiki Kaisha Toshiba, Kawasaki, Japan

[21] Appl. No.: 702,430

[22] Filed: Aug. 9, 1996

[30] Foreign Application Priority Data

Aug. 11, 1995 [JP] Japan .................................... 7-205682
Aug. 11, 1995 [JP] Japan .................................... 7-205685

[51] Int. Cl.$^6$ ........................................................ G06F 13/00
[52] U.S. Cl. .......................... 395/288; 395/326; 395/842
[58] Field of Search .................................. 395/288, 287, 395/842–848, 726, 727

[56] References Cited

U.S. PATENT DOCUMENTS

| | | | |
|---|---|---|---|
| 5,467,295 | 11/1995 | Young et al. | 395/200.05 |
| 5,555,383 | 9/1996 | Elazar et al. | 395/306 |
| 5,603,050 | 2/1997 | Wolford et al. | 395/821 |
| 5,664,197 | 9/1997 | Kardach et al. | 395/728 |

FOREIGN PATENT DOCUMENTS 3-48962  3/1991  Japan .
4-199254 7/1992  Japan .

OTHER PUBLICATIONS

"82C37A–5 CHMOS High Performance Programmable DMA Controller", INTEL® Peripheral Components, 3–33–3–50 (1988).

"Mobile PC/PCI DMA Arbitration and Protocols," Intel Corporation, Apr. 1996, Revision 2.2, pp. 1–27.

PCI Local Bus Specification, PCI Special Interest Group, Revision 2.1 (1995).

*Primary Examiner*—Meng-Ai T. An
*Assistant Examiner*—Paul R. Myers
*Attorney, Agent, or Firm*—Finnegan Henderson, Farabow, Garrett & Dunner, L.L.P.

[57] ABSTRACT

A computer system for detecting a resource lock state on a PCI bus includes a DMA controller that transmits a bus access request signal from an I/O expansion device through a bridge device to a bus arbiter, and receives a granted bus access enable signal from the bus arbiter. The computer system further has a circuit for determining whether the PCI bus is in a resource lock state by using a lock signal at a granted bus access enable signal, and a circuit for prohibiting the DMA controller from executing a transaction for DMA transfer, when the PCI bus is in a resource lock state.

23 Claims, 7 Drawing Sheets

RESOURCE DETECTED AS BEING LOCKED

FIG. 5

RESOURCE DETECTED AS BEING NOT LOCKED

METHOD AND APPARATUS FOR DETECTING A RESOURCE LOCK ON A PCI BUS

FIELD OF THE INVENTION

This invention relates to computer systems, and in particular, order retrying of a transaction and bus releasing of a bus master that begins the transaction in a computer system.

BACKGROUND OF THE INVENTION

Standard system buses, such as ISA (industry Standard Architecture) and EISA (Extended ISA) buses, are conventionally used in personal computers. Another standard bus, PCI (Peripheral Component Interconnect) bus, is commonly employed in desktop-type personal computers to increase the speed of data transfer and organize system architecture, independently of the kind of processors.

In a PCI bus, block transfer is the basis of substantially all data transfer. Transfer of each block is executed by burst transmission. For example, a maximum data transfer speed of 133 megabytes/sec. can be used on a data bus having a width of 32 bits.

Therefore, when a PCI bus is used, data transfer between I/O devices and between a system memory and an I/O device is executed at high speed. As such, system performance is increased.

Figure 1:
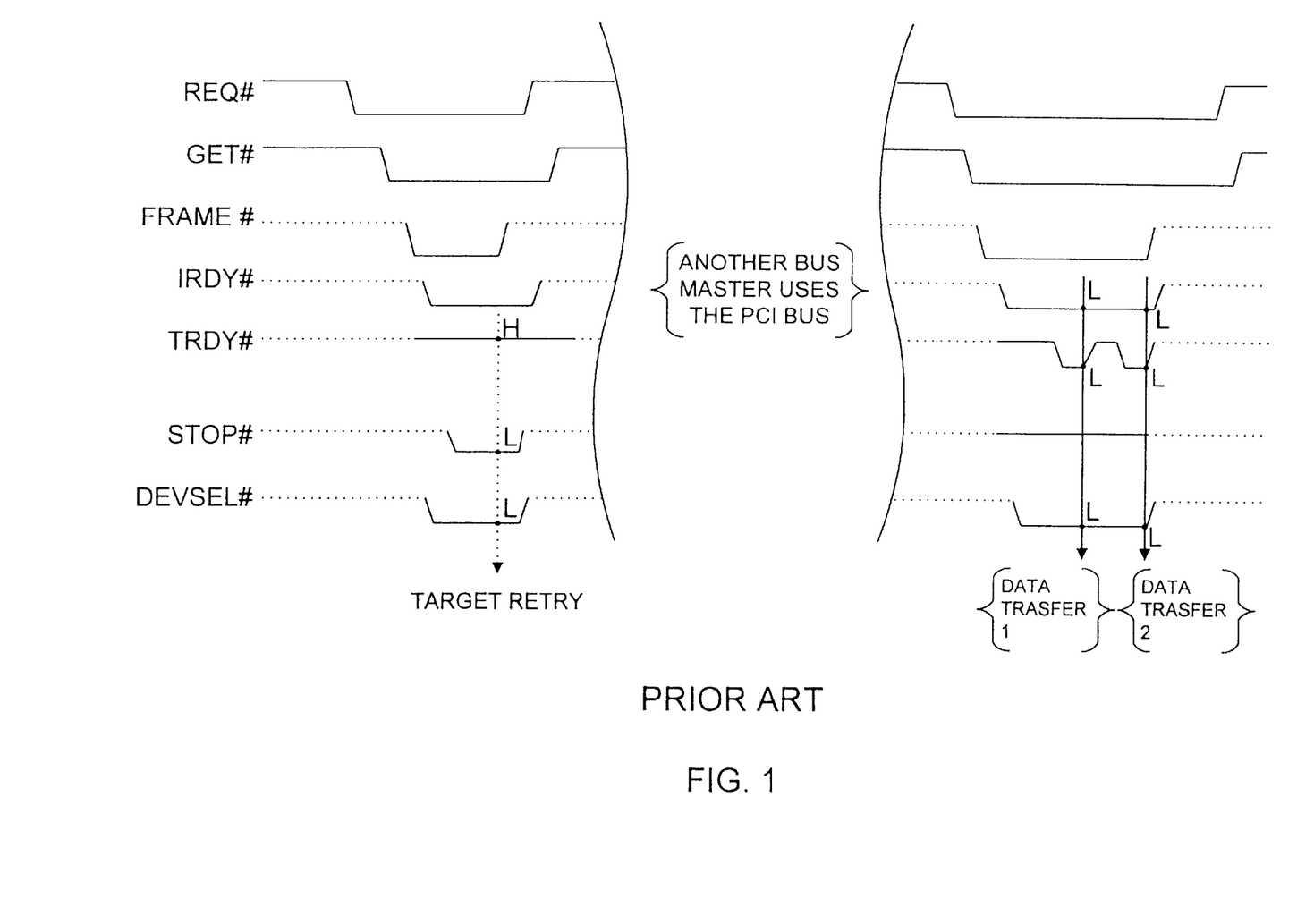
FIG. 1 is a timing chart to explain an operation of a target retry executed by a prior art PCI bus master.

Another function of the PCI bus is target retry. Where a "target device" on the PCI bus cannot respond to a present transaction, the device that initiated the transaction referred to as the "initiator," receives signals indicating target retry and end of transaction. For instance, when a memory serving as the target device is locked due to exclusive access by other bus masters, and is exclusively used under the control of an OS, or is refreshed, a target retry is generated. The initiator (a bus master) receiving the target retry must release the PCI bus. The operation of a normal bus master at the time when a target retry is informed is illustrated in FIG. 1.

The bus master outputs a bus access request signal REQ# and requests bus access from a PCI bus arbiter, which performs arbitration of bus accesses on the PCI bus. The bus master waits for a GNT# signal generated by the PCI bus arbiter. If the bus master receives the GNT# signal, the bus master activates a frame signal FRAME# to begin a transaction. At this time, if the target device specified by the address output by the bus master cannot respond to the transaction, the target device activates a target ready signal TRDY#, a stop signal STOP#, and a device selection signal DEVSEL# on the PCI bus as "H", "L", and "L", as shown in FIG. 1. The bus master makes the REQ# inactive at that time and invalidates the GNT# to release the PCI bus. Thus, the use of the PCI bus by other bus masters becomes possible.

After a predetermined time following the bus master receiving a target retry, the bus master retries the closed transaction. If the target retry is not generated in this transaction, data transfer between the bus master and the target device is normally executed. When all necessary data transfer have been completed twice, as shown in FIG. 1, the bus master makes the REQ# inactive to release the PCI bus.

Recently, PCI busses are used not only in desktop type personal computers, but also in portable personal computers, such as notebook-type computers. Since PCI busses do not support the DMA transfer supported in the ISA bus, DMAC (DIRECT MEMORY ACCESS CONTROLLER) is necessary to interface a PCI bus system with an ISA device.

However, where the DMAC implemented in a PCI bus performs the bus master operation as described above, the DMAC has already sent a DMA acknowledge signal to an ISA device which requests DMA transfer, after receiving a GNT# signal from the bus arbiter on a PCI bus. If the DMAC releases the PCI bus once by notification of a target retry from a target device, the DMA acknowledge signal drops in unexpected timing. Therefore, the DMAC cannot execute a normal DMA transfer to the ISA device.

SUMMARY OF THE INVENTION

One object of this invention is to improve the compatibility between different architectures.

Another object of this invention is to improve the reliability of DMA transfer processing, where the DMAC is implemented in the PCI bus architecture.

In accordance with the present invention, the foregoing objects, among others, are achieved by providing a computer system comprising a PCI bus on which a lock signal line indicating whether an access to a resource is exclusively executed and a bus access request signal line and a bus access enable signal line are allocated into each of PCI agent devices, a bus arbiter means, connected to the PCI bus, for arbitrating bus accesses by using the bus access request signal line and the bus access enable signal line, DMA controller means, connected to the PCI bus, for requesting a bus access to the bus arbiter means, in response to a DMA transfer request from each of I/O expansion devices, and for executing a transaction for a direct memory access (DMA), in response to a reception of a bus access enable signal from the bus arbiter means, wherein the DMA controller means including, resource lock detection means for determining whether the PCI bus is in a state of resource lock by using the lock signal, and resource lock means for prohibiting the DMA controller means from executing a transaction for DMA transfer, when the PCI bus is in a state of resource lock.

There has also been provided, in accordance with yet another aspect of the present invention, a method of detecting a state of a resource lock by DMA controller means on a PCI bus, on which a lock signal line indicating whether an access to a resource is exclusively executed and a bus access request signal line and a bus access enable signal line are allocated into each of PCI agent devices, the method of comprising the steps of transmitting a bus access request signal from an I/O expansion device through a bridge device to bus arbiter means, receiving a granted bus access enable signal to the DMA controller means by the bus arbiter means, determining whether the PCI bus is in a state of resource lock by using the lock signal at the granted bus access enable signal, and prohibiting the DMA controller means from executing a transaction for DMA transfer, when the PCI bus is in a state of resource lock.

In the computer system of this invention, the DMA controller detects whether there is a resource put into the state of lock by other bus masters on the PCI bus. If it is not in a state of resource locking, the DMA controller does not perform the transaction for beginning DMA transfer. Therefore, the target retry generated in the transaction for the DMA transfer is caused other than the bus lock. Thus, even if the DMA controller does not release the bus access by the target retry, as a result, a memory device is not permanently locked. Therefore, it can prevent the DMA transfer from malfunctioning in view of the generation of the target retry.

Other objects, features, and advantages of the present invention will become apparent from the following detailed description. It should be understood, however, that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 2:
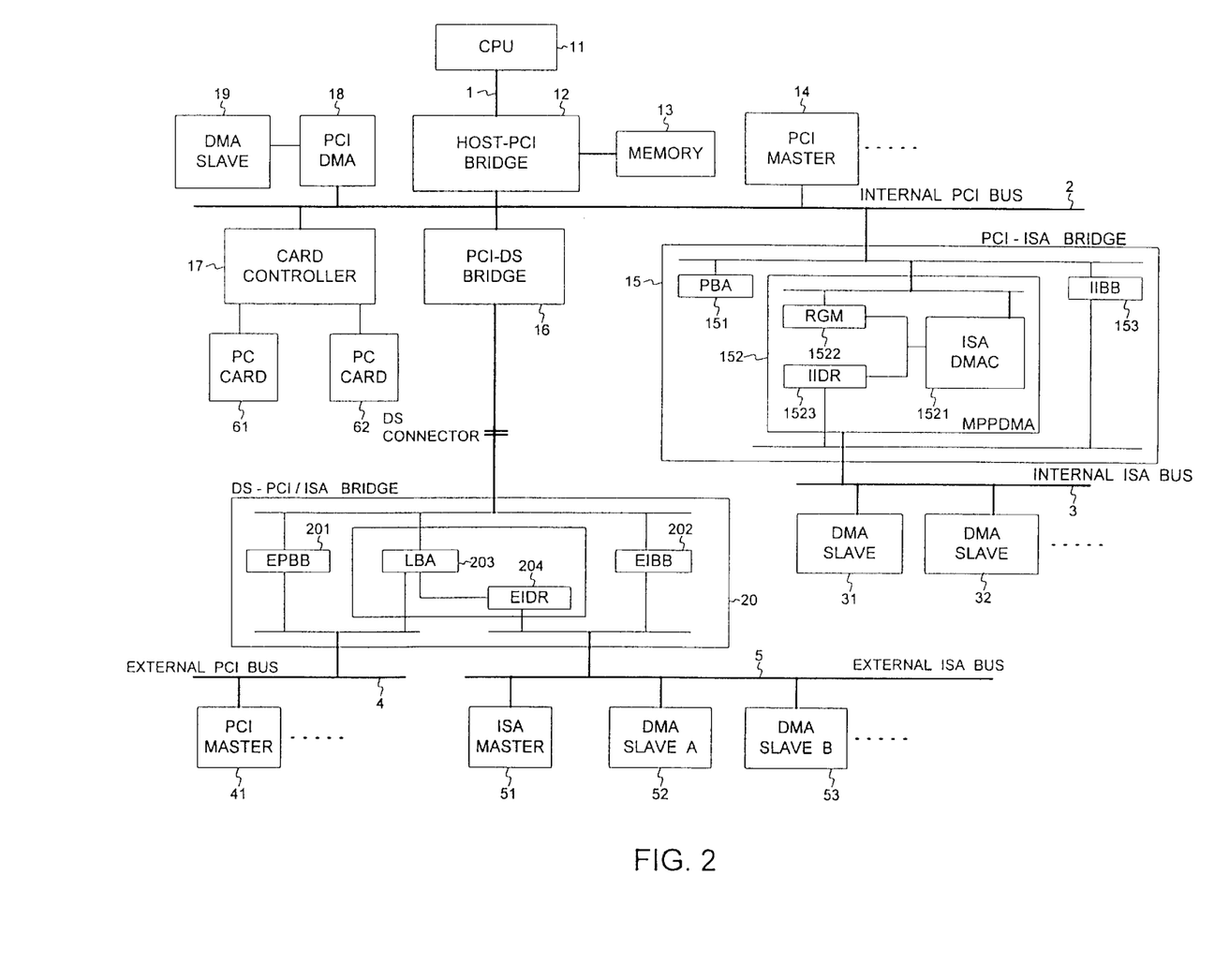
FIG. 2 is a block diagram of a portable computer system in accordance with one embodiment of this invention.

FIG. 2 shows the structure of a computer system, according to one embodiment of this invention. This computer system is preferably a notebook type or laptop type portable computer. As shown in FIG. 2, three types of buses, i.e. a processor bus 1, an internal PCI bus 2 and an internal ISA bus 3, are arranged on the system board thereof. An external PCI bus 4 and an external ISA bus 5 are arranged in a docking station connected to a DS connector of the portable personal computer.

The system board provides a CPU 11, a hostPCI bridge device 12, a system memory 13, various types of PCI master devices 14, an internal PCI-ISA bridge device 15, a PCI-DS (DS: docking station) bridge device 16, a PC card controller 17, and a PCI DMA 18. Also, a DS-PCI/ISA bridge device 20 is provided in the docking station.

CPU 11 is preferably a "Pentium" microprocessor produced and marketed by the Intel Company. Processor bus 1 is directly connected to input/output pins of CPU 11 and preferably has a 64-bit data bus.

System memory 13 is a memory device for storing an operating system, device drivers, application programs to be executed, and data for processing. Memory 13 is preferably formed by a plurality of DRAMs. System memory 13 is connected to host/PCI bridge device 12 via a memory bus having a 32-bit or 64-bit data bus. Processor bus 1 serves as a data bus for the memory bus. In such a case, the memory bus is formed by an address bus and various types of memory control signal lines.

Host/PCI bridge device 12 is a bridge LSI for coupling processor bus 1 and internal PCI bus 2, and functions as one bus master of a PCI bus. Host/PCI bridge device 12 can directionally convert bus cycles including data and addresses, can control access of system memory 13 via a memory bus, between processor bus 1 and internal PCI bus 2, and can provide locking for exclusively using system memory 13. This locking function is used by the bus master and CPU 11, etc. on a PCI bus.

Internal PCI bus 2 is a clock-synchronization type input/output bus. All cycles on internal PCI bus 2 are synchronized with a PCI bus clock. Clock speed of internal PCI bus 2 is preferably no greater than 33 MHz. Internal PCI bus 2 has an address/data bus used in a time division manner. This address/data bus has a width of 32 bits.

A data transfer cycle on internal PCI bus 2 is formed from an address phase and one or more data phases following thereafter. An address and transfer type are output in the address phase. 8-bit, 16-bit, 24-bit or 32-bit data are output in the data phases A Lock signal LOCK # defined on internal PCI bus 2 indicates whether the access to the device specified as the target of the data transfer is exclusively executed or not. That is, if the LOCK# signal is active, the access is in a state of a resource lock. The access to some target devices other than targets locking exclusively being used is permitted by other bus masters.

Moreover, if the target device cannot respond to a present transaction (an address phase and a data phase), a target retry is generated by the target device. That is, the target retry of the transaction and the releasing of a PCI bus are ordered to the bus master who began the transaction.

PCI master device 14 is one bus master of internal PCI bus 2 as well as host/PCI bridge device 12, and operates as an initiator or target. All devices on internal PCI bus 2 work as a target even without functioning as the bus master. The term "target" means the resource whose address is specified by an initiator, preferably a bus master, that began a transaction.

Internal PCI-ISA bridge device 15 is a bridge LSI for coupling internal PCI bus 2 and internal ISA bus 3. A memory and a plurality of ISA I/O devices 31, 32 are connected to internal ISA bus 3. These I/O devices, referred to as DMA slaves, are devices for requesting DMA transfer to a DMAC incorporated in internal PCI-ISA bridge device 15. A PCI bus arbiter (PBA) 151, a DMAC core (MPPDMA) 152 and an internal ISA bus bridge (IIBB) 153 are incorporated in internal PCI-ISA bridge device 15.

PCI bus arbiter (PBA) 151 arbitrates bus accesses between all bus master devices connected to internal PCI bus 2. In this arbitration, signal lines (a bus request signal REQ# line and a grant signal GNT# line) on internal PCI bus 2 are allocated in one pair to each bus master device.

A bus request signal REQ# is a signal for notifying PCI bus arbiter (PBA) 151 of a request from a device corresponding therewith to use internal PCI bus 2. A grant signal GNT# is a signal for notifying the device that issued a bus request signal REQ# that it has accessed internal PCI bus 2.

Also, in this system, among the plurality of groups of REQ# and GNT# lines defined on internal PCI bus 2, one REQ# and GNT# line group allocated to DS-PCI/ISA bridge device 20 is used for a DMA serial channel protocol for transmission and reception of DREQs and DACK#s between DMA slaves connected to external ISA bus 5.

All of the bus request signal REQ# lines and grant signal GNT# lines on internal PCI bus 2 are connected to PCI bus arbiter (PBA) 151. Arbitration of bus access right is controlled by PCI bus arbiter (PBA) 151.

DMAC core (MPPDMA) 152 is formed from the three blocks of an ISA DMAC 1521, a bus request and grant manager (RGM: REQ#, GNT# manager) 1522, and an internal ISA DMA router (IIDR) 1523. DMAC core (MPPDMA) 152 is an independent function block within internal PCI-ISA bridge device 15. Only other blocks operate functions other than DMA, DMAC core (MPPDMA) 152 not being used.

Figure 3:
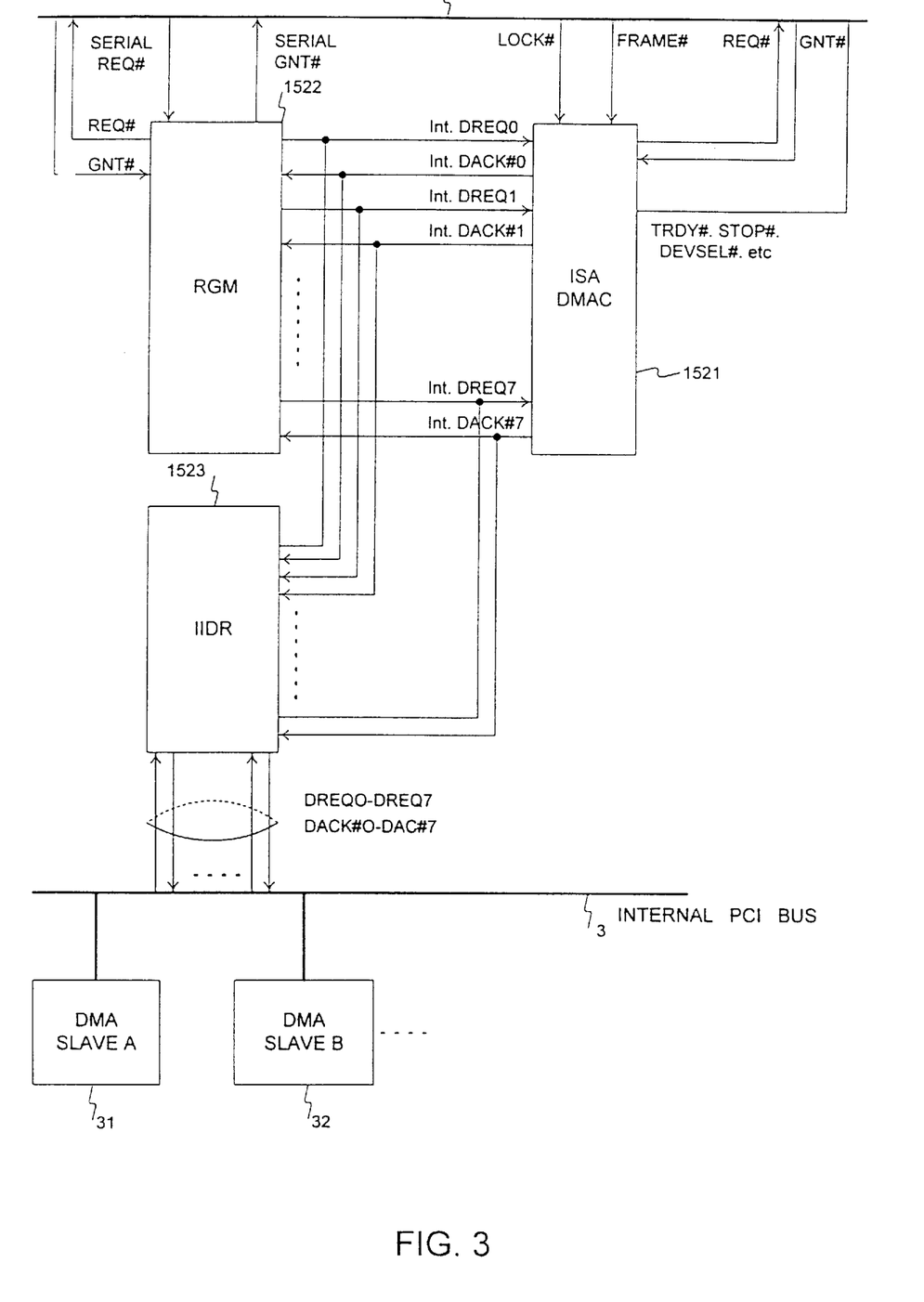
FIG. 3 is a block diagram showing the components of a DMAC core in the system shown in FIG. 2.

The specific connections of ISA DMAC 1521, request and grant manager (RGM) 1522 and internal ISA DMA router (IIDR) 1523 are illustrated in FIG. 3.

ISA DMAC 1521 is connected to internal PCI bus 2, and executes DMA transfer, according to a request from a DMA slave device requiring DMA transfer.

DMA slaves are logically connected to internal PCI bus 2. In most cases, they are connected to internal ISA bus 3 or external ISA bus 5 through a bridge 15 or 20.

ISA DMAC 1521 has a DREQ input port where internal DREQs 0 to 7 are input and a DACK# output port for outputting internal DACK#s 0 to 7. Both the DREQ input ports and the DACK# output ports are connected to RGM 1522 and IIDR 1523. Transmission and reception of DREQs and DACK#s between the DMA slaves 31, 32, ... and ISA DMAC 1521 on internal ISA bus 3 are executed via IIDR 1523. Also, transmission and reception of DREQs and DACK#s between a ISA master 51 and DMA slaves 52, 53 on external ISA bus 5 and ISA DMAC 1521 are performed by DMA serial channel protocol via RGM 1522.

Since ISA DMAC 1521 is connected to internal PCI bus 2 and devices requesting DMA transfer are connected to internal ISA bus 3 or external ISA bus 5, a read cycle (I/O read or memory read) and a write cycle (memory write or I/O write) are not generated simultaneously in DMA transfer by ISA DMAC 1521. That is, first, a read cycle is performed, after which the read data at that time are latched to a buffer in ISA DMAC 1521. Next, a write cycle is executed and the previously latched data are output as write data.

ISA DMAC 1521 generates both a read cycle and a write cycle on internal PCI bus 2, irrespective of whether they are memory or I/O. Further, the bridge device 15 or 20 converts a bus cycle on internal PCI bus 2 to an ISA bus cycle. Namely, ISA DMAC 1521 generates both memory cycles and DMA exclusive I/O cycles on internal PCI bus 2 and is not concerned with ISA bus cycles.

ISA DMAC 1521 has preferably one 82C37 compatible function, which is the ISA bus system architecture standard, and supports DMA channels CH0 to CH7 by means of internal DREQs 0 to 7 and internal DACK#s 0 to 7. Among these channels, because DMA channel CH4 is used to cascade-connect two DMAC controllers, it is not used for DMA transfer. As a result, DREQ4 and DACK#4 among the internal DREQs 0 to 7 and internal DACK#s 0 to 7 are actually not connected to either RGM 1522 or IIDR 1523.

ISA DMAC 1521 performs arbitration of DMA channels by using the internal DREQs 0 to 7 and internal DACK#s 0 to 7 prepared in one pair each for every DMA channel. An internal DREQ is a DMA request signal used to notify ISA DMAC 1521 that a DMA slave is requesting execution of DMA transfer. A DACK# is a DMA acknowledgment signal by which ISA DMAC 1521 notifies commencement of DMA cycle execution of a DMA slave which has requested DMA transfer. The DMA slave which is the subject of DMA transfer is selected by this DACK#.

Allocation of the DMA channels is exclusively performed between devices on internal ISA bus 3 and devices on external ISA bus 5. Each device transmits to and receives from ISA DMAC 1521 the DREQ and DACK# corresponding to the DMA channel allocated thereto.

In this case, transmission and reception of the DREQ and DACK# between external ISA bus 5 and ISA DMAC 1521, as described above, are executed, according to the DMA serial channel protocol by using one group of serial REQ# and serial GNT# signal lines. The DMA serial channel protocol can decrease the number of signal lines that should be derived to the docking station, and use both a PCI expansion card and a ISA expansion card in the docking station.

In this DMA serial channel protocol, the most recent DREQ state is transmitted from DS-PCI/ISA bridge device 20 by a serial REQ#. This is sent to RGM 1522. In RGM 1522, the serial REQ# is converted to internal DREQs 0 to 7 for ISA DMAC 1521.

Further, channel information of DMA transfer indicated by the internal DACK#s 0 to 7 output from ISA DMAC 1521 is sent to DS-PCI/ISA bridge device 20 by a serial transfer using the serial GNT# signal line and executed by RGM 1522.

ISA DMAC 1521 preferably performs 82C37 compatible arbitration between DREQ channels, according to setting and adjustment of a DREQ channel mask, based on the most recent DREQ channel information provided from RGM 1522 and IIDR 1523. If there is an effective DMA request (DREQ), ISA DMAC 1521 first activates a REQ# allocated to itself and sends a request for bus access right to PCI bus arbiter (PBA) 151. ISA DMAC 1521 waits for a GNT# to be granted by PBA 151.

If a GNT# is given from PBA 151, first of all, ISA DMAC 1521 detects whether internal PCI bus 2 is in a state of resource locking. This detection is executed by a resource lock detection logic device installed in ISA DMAC 1521.

That is, the resource lock detection logic device always monitors LOCK# and FRAME# signals defined on internal PCI bus 2, and decides whether to be in a state of the resource locking according to the state of those signals. LOCK# is an interface control signal for indicating whether an exclusive access is executed for a resource on internal PCI bus 2. For instance, LOCK# is used by an initiator who needs exclusive access of system memory 13. FRAME# is a signal for indicating the beginning and the period of a transaction, and the generation of FRAME# is controlled by an initiator.

Figure 4:
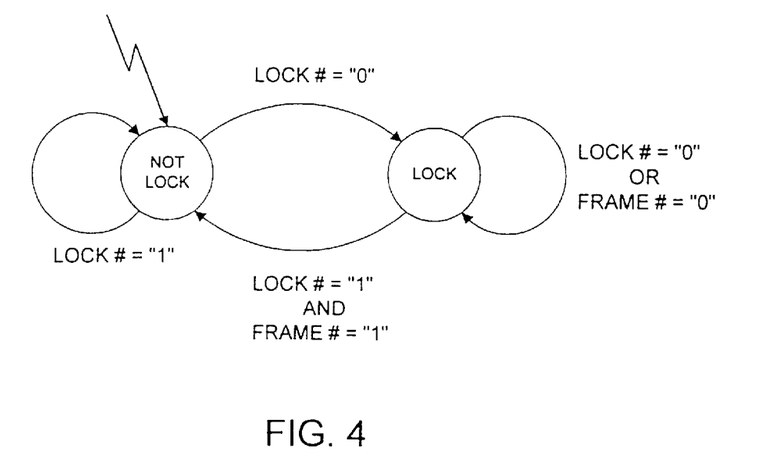
FIG. 4 is a state diagram illustrating resource lock detection used by the system of FIG. 2.

Here, the method of detecting resource lock is explained referring to FIG. 4.

Internal PCI bus 2 has two states relating to the resource locks, as understood from the state transition chart of FIG. 4. If LOCK# is set in "0" by an initiator, internal PCI bus 2 changes from the non-lock state to the lock state. The lock state is maintained as long as either the LOCK# is "0" or FRAME# is "0". When LOCK # and FRAME# are both set to "1", the PCI bus changes from the lock state to the non-lock state. The non-lock state is maintained as long as LOCK# is set to "1". Details of the resource lock in the PCI bus system are described in dated Jun. 1, 1995 "PCI Local Bus Specification" written by PCI Special Interest Group, the content of which is hereby incorporated by reference.

If both LOCK# and FRAME# are inactive "1", the resource lock detection logic device determines that internal PCI bus 2 is not in a state of resource locking. That is, a target device is not resource-locked.

Figure 5:
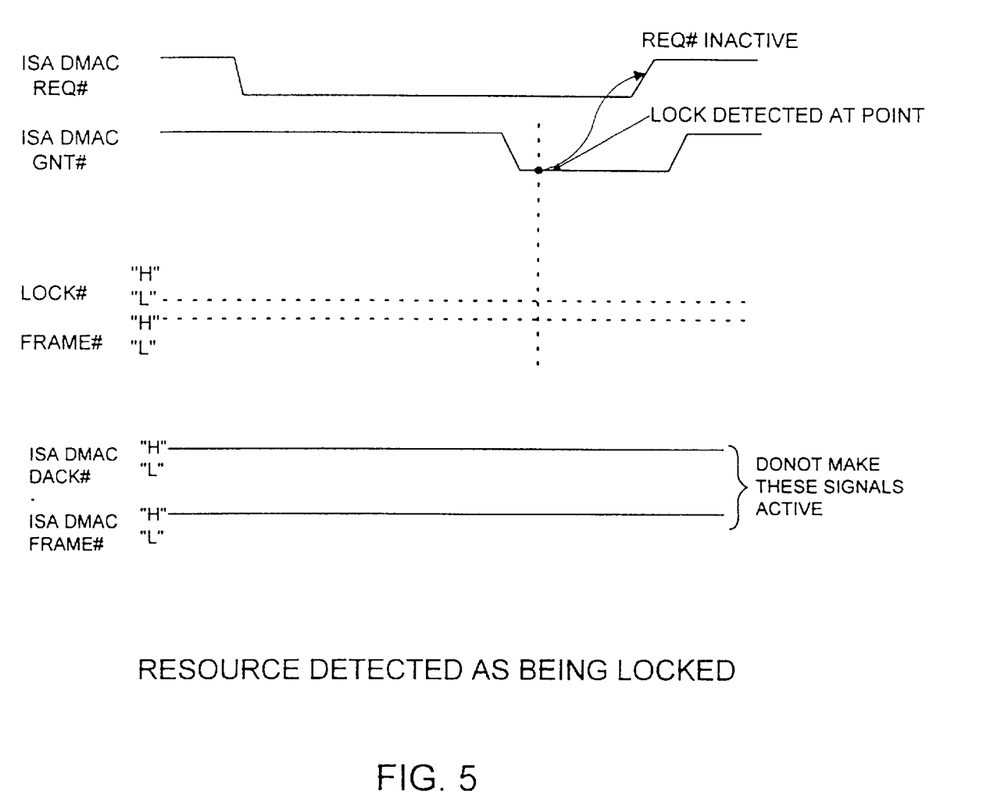
FIG. 5 is a timing chart for the system of FIG. 2 showing the operation of ISA DMAC when resource lock is detected.

FIG. 5 explains the timing of the operation for ISA DMAC 1521 when the resource lock is detected by the resource lock detection logic device.

If a GNT# is given from PBA as shown in FIG. 5, ISA DMAC inquires to the resource lock detection logic device as to whether internal PCI bus 2 is in a state of the resource lock. The resource lock detection logic device controls the state transition explained as shown in FIG. 4 by using LOCK# and FRAME#. If internal PCI bus 2 is in a state of the resource lock, the resource lock detection logic device informs ISA DMAC 1521 of the resource lock state, preventing ISA DMAC 1521 from executing the transaction for DMA transfer. Specifically, the resource lock detection logic device prevents DACK# and FRAME# output from ISA DMAC 1521, and makes REQ# inactive and invalidates GNT#.

Figure 6:
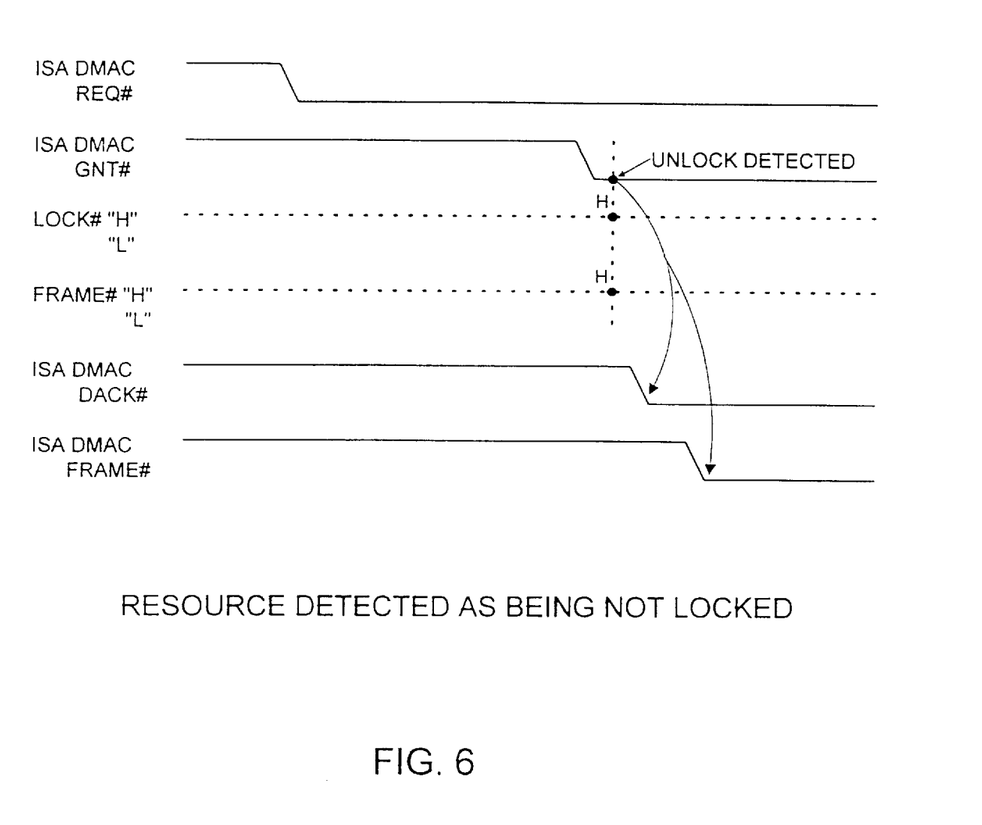
FIG. 6 is a timing chart for the system of FIG. 2 showing the operation of ISA DMAC if resource lock is not detected.

FIG. 6 explains the operation timing of ISA DMAC 1521 when resource locking is not detected.

When the resource lock detection logic device detects that internal PCI bus 2 is not in a state of the resource lock, that is, LOCK#="1" and FRAME#="1", it permits ISA DMAC 1521 to execute DMA transaction. That is, ISA DMAC 1521 makes an active internal DACK# corresponding to the DMA channel number selected on the result of arbitration. ISA DMAC 1521 returns the DMA channel number for the DMA transfer to RGM 1522 and IIDR 1523. ISA DMAC 1521 makes FRAME# active and executes the DMA bus cycle corresponding to the DMA transfer mode provided by setup information on the selected DMA channel. That is, a single transfer mode, a block transfer mode, a demand transfer mode, and a cascade mode. In this case, ISA DMAC 1521 supports only bus cycles on the PCI bus for memory cycles and I/O cycles. Bus cycles on the ISA bus is emulated by PCI-ISA bridge device 15 and DS-PCI/ISA bridge device 20.

Host-PCI bridge 12 converts the memory cycles generated on internal PCI bus 2 into DRAM access cycles and executes read/write accesses to system memory 13. Thus, ISA DMAC 1521 controls a lock state on the PCI bus. Only when there is not a target device in a state of the resource locking, that is, the PCI bus is not in a state of the resource locking, ISA DMAC 1521 makes DACK# active, and begins DMA transfer.

Further, ISA DMAC 1521 monitors signals TRDY#, STOP#, and DEVSEL# on internal PCI bus 2, while executing the transaction for DMA transfer. ISA DMAC 1521 detects that a target retry from a target device is informed by combining those signals. That is, TRDY# is inactive, STOP# is active, and DEVSEL# is active. For instance, when Host-PCI bridge 12 is locked by an OS, a target retry is informed from Host-PCI bridge to ISA DMAC 1521 since Host-PCI bridge cannot respond to the transaction from ISA DMAC 1521.

Here, TRDY# is a signal to notify that a target device completes a present data phase and has entered a ready state. STOP# is a signal causing a target device to request an initiator to stop a present transaction. DEVSEL# is a signal output from a target device specified by an address, and indicates that a target device was selected.

When a target retry is detected, ISA DMAC 1521 retries the same bus cycles as bus cycles ended by the target retry after waiting a certain time. However, ISA DMAC 1521 does not release internal PCI bus 2. That is, even if the bus cycles under execution is ended by a target retry, ISA DMAC 1521 again retries with an active REQ#. This is the reason that a DMA transfer between DMA slaves and system memory 13 is normally completed. If an exclusive access to memory device 13 ends by the OS, the target retry by ISA DMAC 1521 succeeds.

Figure 7:
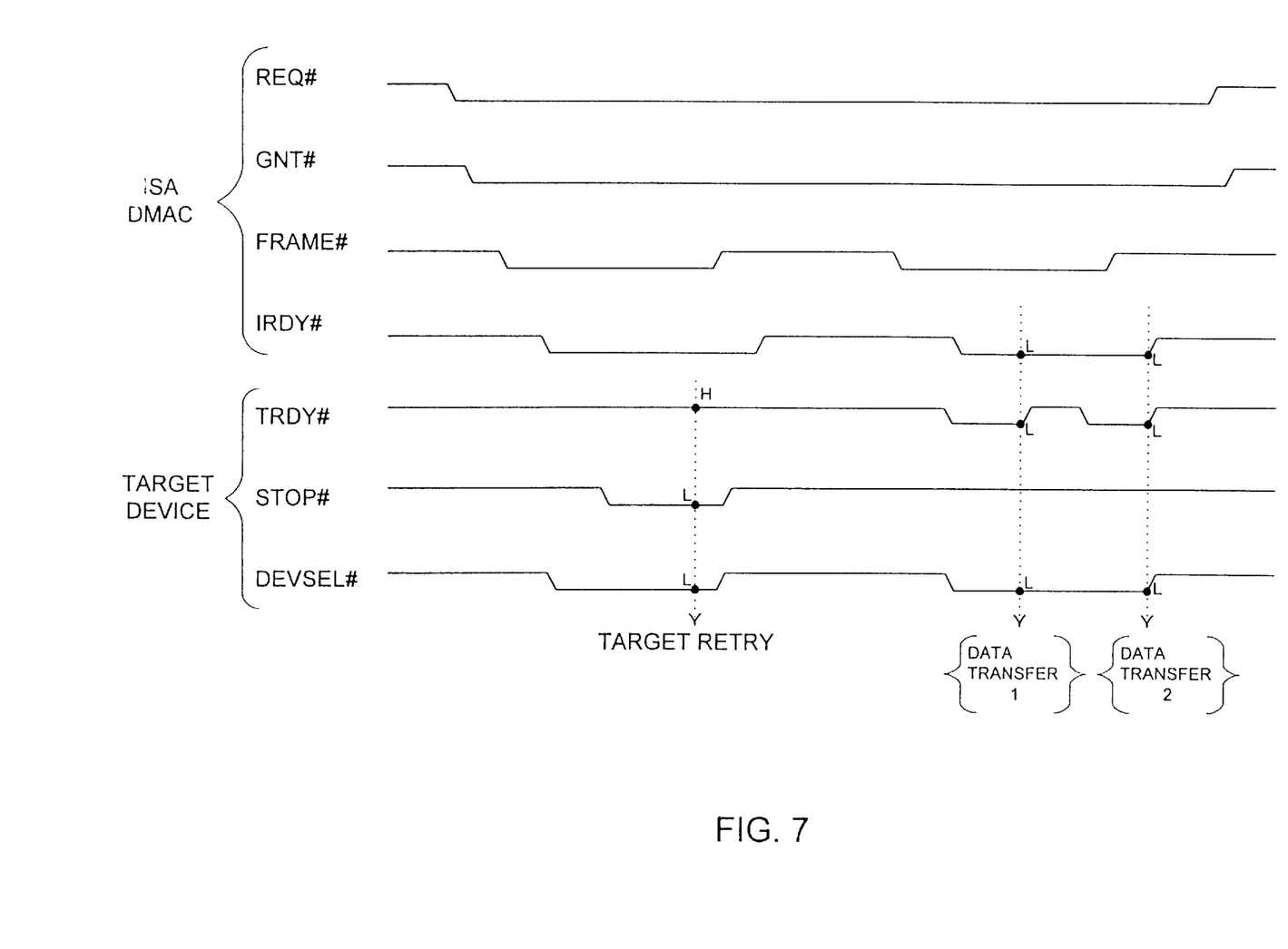
FIG. 7 is a timing chart for the system of FIG. 2 showing the operation of ISA DMAC when a target retry is generated.

FIG. 7 shows the operation timing of ISA DMAC 1521 when a target retry is generated by a target device.

ISA DMAC 1521 outputs REQ# and requests the bus access to PBA. ISA DMAC 1521 waits for GNT# to be given from PBA 151. If ISA DMAC 1521 receives the GNT#, ISA DMAC 1521 makes FRAME# active and begins a transaction. When Host-PCI bridge 12, acting as a target device specified by addresses output from ISA DMAC, cannot respond to the transaction at this time, the target device sets TRDY#, STOP#, and DEVSEL# on the PCI bus to "H", "L", and "L" respectively as shown in FIG. 7. As a result, ISA DMAC 1521 is informed of a target retry from the target device.

ISA DMAC 1521 ends bus cycles with an active REQ#. ISA DMAC 1521 again retries the same bus cycles as the ended bus cycles, when a fixed period has passed since ISA DMAC 1521 was informed of the target retry. Data transfer between ISA DMAC 1521 and the target device is normally executed if the target retry is not generated at the bus cycles. If all necessary data transfers of two times were completed, ISA DMAC 1521 makes REQ# inactive and releases the PCI bus. Two transfers are completed, as shown in FIG. 7.

Next, the operation of RGM 1522 as shown in FIG. 2 is explained.

RGM 1522 serializes the plurality of DMA channels and manages the states of the serial REQ# and the serial GNT# in order to perform processes relating to the DMA serial channel protocol which is to transfer. RGM 1522 performs conversion between the DMA serial channel protocol and the DREQ/DACK# protocol of the ISA style regarding ISA DMAC 1521.

REQ# signals are input to RGM 1522. Also, the protocol of the REQ# is programmed for each REQ# signal. Consequently, if a number of pairs of REQ# and GNT# signal lines used as serial REQ#s and serial GNT#s are prepared, DMA serial channel protocol is used to receive and transmit DREQs and DACK#s between not only devices on external ISA bus 5, which are performed through DS-PCI/ISA bridge device 20, but also PC cards 61 and 62 of the PC card controller and ISA DMAC 1521.

RGM 1522 converts between DMA serial channel protocol and REQ#/GNT protocol for arbitration of the standard PCI style supported by PBA 151.

In other words, the DMA serial channel protocol is used to receive and transmit not only DREQs and DACK#s with devices on external ISA bus 5, but also REQs and GNT#s with the PCI master on external PCI bus 4. Processing of the REQ#s and GNT#s in this case is performed in the following manner by RGM 1522.

The PCI master, such as LAN board or SCSI board on external PCI bus 4, informs DS-PCI/ISA bridge device 20 of a bus access request by activating the REQ#. DS-PCI/ISA bridge device 20 informs RGM 1522 of the bus access request by serial data transfer by using the serial REQ#. In such a case, notification of the bus access request uses DREQ 4 which is the DMA channel not used by an ISA device.

RGM 1522 decomposes the serial REQ# signal and, upon detecting that the DREQ 4 has been notified by the serial REQ#, activates the REQ# and makes a request to PBA 151 for bus access. PBA 151 arbitrates based upon the standard PCI rule and enables bus access for RGM 1522 by means of a GNT#.

RGM 1522, upon receiving the GNT# from PBA 151, notifies DS-PCI/ISA bridge device 20 by means of serial transfer data using a serial GNT# that bus access was enabled. The DACK 4 is used in this notification. DS-PCI/ISA bridge device 20 decomposes the serial GNT# signal transmitted by RGM 1522 and supplies the GNT# to PCI master 41. The PCI master commences a bus cycle upon receiving the GNT#.

Internal ISA DMA router (IIDR) 1523 changes a mapped DMA channel to the DMA slaves on internal ISA bus 3, according to programmed mapping information. IIDR 1523 converts the states of DREQ signals from the DMA slaves to internal DREQs corresponding to the DMA channel numbers of these devices, according to mapping information, and sends them to ISA DMAC 1521. Further, IIDR 1523 converts internal DACK#s from ISA DMAC 1521 to DACK#s, which are actually used by the DMA slaves, according to mapping information, and outputs them to internal ISA bus 3.

Internal ISA bus bridge (IIBB) 153 is a bridge LSI for connecting internal PCI bus 2 and internal ISA bus 3, and controls all devices on internal ISA bus 3 such as memories and I/Os. IIBB 153 protocol-converts memory or I/O cycles generated on internal PCI bus 2 for DMA transfer by ISA DMAC 1521, and sends them to internal ISA bus 3.

PCI-DS bridge device 16 is a bridge LSI for connecting internal PCI bus 2 and a docking bus corresponding to the PCI bus leading out to a docking station, and functions as an agent on internal PCI bus 2. A buffer for synchronizing transfer of serial REQ#s/GNT#s by means of DMA serial channel protocol is provided in this PCI-DS bridge device 16.

PC card controller 17 is one PCI bus master and supports DMA serial channel protocol. When PC cards 61, 62 controlled by PC card controller 17 request DMA transfer, the DMA request, i.e. DREQ, is transferred to RGM 1522 by the serial transfer which uses the REQ# signal line allocated to PC card controller 17. Further, a DACK# from RGM 1522 is sent to PC card controller 17 by the serial transfer, which uses the GNT# signal line allocated to PC card controller 17. The serial GNT# is decomposed into a DACK# by PC card controller 17 and passed along to the PC card 61 or 62.

PCI DMA 18 is an agent on internal PCI bus 2 similar to PC card controller 17 and support DMA serial channel protocol. When a DMA slave 19 controlled by the PCI DMA requests DMA transfer, this DMA request, i.e. DREQ, is transmitted to RGM 1522 by a serial REQ#. Also, a serial GNT# from RGM 1522 is decomposed into a DACK# by PCI DMA 18 and informed to DMA slave 19.

DS-PCI/ISA bridge device 20 is a bridge LSI for connecting the docking bus (corresponding to internal PCI bus 2), leading out to the docking station from the main body of the computer via the DS connector, to external PCI bus 4 and external ISA bus 5. DS-PCI/ISA bridge device 20 is one PCI master similar to PC card controller 17 and supports DMA serial channel protocol.

Figure 8:
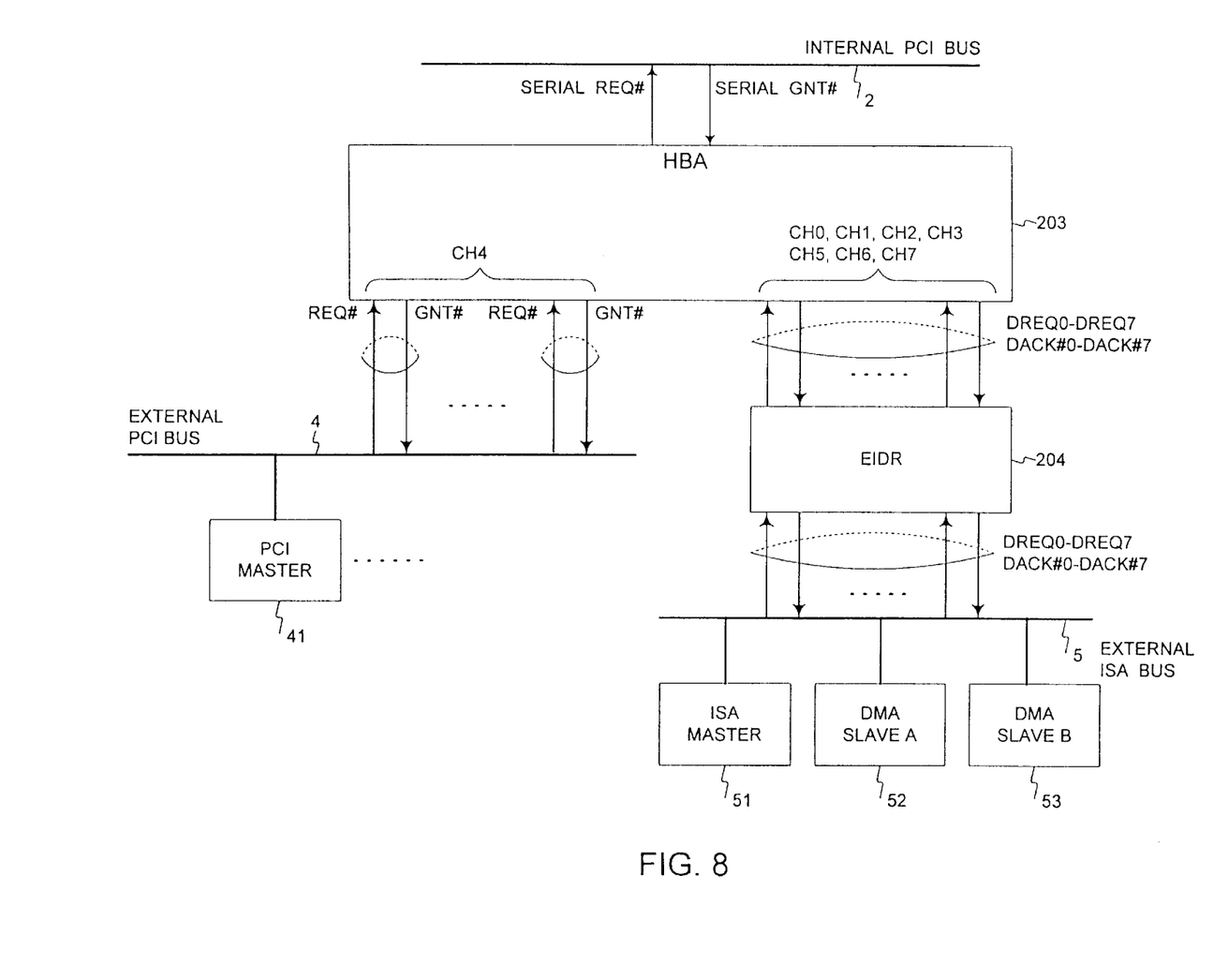
FIG. 8 is a block diagram showing a component of DS-PCI/ISA bridge device 20 installed by the system of FIG. 2.

An external PCI bus bridge (EPBB) 201, an external ISA bus bridge (EIBB) 202, a local bus arbiter (LBA) 203 and an external ISA DMA router (EIDR) 204 are provided in DS-PCI/ISA bridge device 20.

EPBB 201 receives through PCI-DS bridge 16 device memory cycles and I/O cycles generated by ISA DMAC 1521 on internal PCI bus 2, and sends them to external PCI bus 4. Further, where a bus access enable is granted to PCI master device 14 on external PCI bus 4, EPBB 201 generates an external PCI bus transaction on the docking station.

EIBB 202 receives through PCI-DS bridge 16 device memory cycles and I/O cycles generated by ISA DMAC 1521 on internal PCI bus 2, protocol-converts them, and sends them to external ISA bus 5. Further, where a bus access enable is granted to ISA master device 51 on external ISA bus 5, EIBB 202 generates an external ISA bus transaction on the docking station.

LBA 203 and EIDR 204 are provided to support DMA serial channel protocol, and their connection relationships are illustrated in FIG. 5.

LBA 203 monitors changes in the states of bus access requests REQ# from the PCI bus master on external PCI bus 4 and DREQ signals (basically of the amount of ISA DMA channels) from ISA master 51 on external ISA bus 5 and DMA slaves 52, 53, and sends the most recent state through PCI-DS bridge 16 device by serial transfer of a bit line by using a serial REQ# to RGM 1522.

The format of the bit string transmitted by a serial REQ# is as follows.

s 0 1 2 3 4 5 6 7

REQ# H,H,H,L,H,L,H,L,H,L,L,H,L,L, . . .

LBA 203 takes the leading edge of the activated REQ# as the start bit (S), thereafter by using DMA channels 0 to 7 per each clock frame and sending them in series. The frame of channel 4 is used to send changes in the bus request state of the PCI master, while all other channels are used to send changes in the states of DMA requests of ISA master 51 and DMA slaves 52, 53 on external ISA bus 5.

In each frame, "L" is taken to mean that there is no request and "H" is taken to mean that there is a request. In the above example, DREQs 0, 2 and 7 are active and correspond to a state where PCI master 41 on external PCI bus 4 is requesting bus access (DREQ 4 is active).

LBA 203 has two operating states (proceed and freeze). Until LBA 203 receives a serial GNT# from RGM 1522, LBA 203 is in a proceed state and works to continuously send the most recent state to RGM 1522. In other words, in a proceed state, whenever a change in the state of a REQ# of PCI bus master 41 on external PCI bus 4 or DREQs of ISA master 51 and DMA slaves 52, 53 on external ISA bus 5 is generated, RGM 1522 is notified by DMA serial channel protocol.

When a serial GNT# is received from RGM 1522, LBA 203 decodes the bit string including the serial GNT# and either returns a DACK# to EIDR 204 or returns a GNT# on external PCI bus 4.

The format of the bit string transmitted by the serial GNT# from RGM 1522 is as follows.

s 0 1 2

GNT# H,H,H,L,H,L,L,L, . . .

RGM 1522 takes the leading edge of the activated GNT# as the start bit (S). Thereafter RGM 1522 allocates one bit per one clock frame, in sequence from the LSB, information 3-bit coded from one of the DMA channel DACK#s 0 to 7, and sends it in series. The code of channel 4 is used to send a GNT# corresponding to a bus request state of PCI master 41 on external PCI bus 4, while all other codes are used to send DACK#s corresponding to DMA requests of ISA master 51 and DMA slaves 53 on external ISA bus 5.

Under the above example, DMA channel 1, which is channel code=1, was selected (DACK1# was supplied).

Upon receiving a GNT#, the operating state of LBA 203 is switched from a proceed state to a freeze state. The freeze state is maintained until the device (PCI master 41, ISA master 51 or DMA slave 52, 53) corresponding to the GNT# withdraws its bus access request. At that time, execution of serial REQ# cycles for reporting such operating states are frozen, even if changes in the states of other devices occur, and REQ#s continue to be maintained in active states.

In the DMA serial channel protocol of this system, the frame allocated by the use of PCI master 41 is channel 4 only, resulting in a case where a plurality of PCI masters exist on external PCI bus 4, and LBA 203 performs arbitration between REQ#s from the plurality of PCI masters.

EIDR 204 changes mapped DMA channels into ISA master 51 and DMA slaves 52, 53 on external ISA bus 5, according to programmed mapping information. In cooperation with EIDR 204 and the previously described IIDR 1523, DMA channels can be exclusively allocated to devices on internal ISA bus 3 and devices on external ISA bus 5.

EIDR 204 changes the state of DREQ signals from each of ISA master 51 and DMA slaves 52, 53 to DREQ signals corresponding to the DMA channel numbers of these devices, according to mapping information, and sends them to LBA 203. Further, EIDR 204 changes DACK#s from LBA 203 into DACK#s actually used by ISA master 51 and DMA slaves 52, 53, according to mapping information, and outputs them to external ISA bus 5.

The flow of the DMA transfer process executed by ISA DMAC 1521 is now explained.

(1) DRQ arrangement of ISA interchange

ISA DMAC 1521 receives an ISA compatible DREQ signal from IIDR 1523 and RGM 1522. Based on this, it performs arbitration, and determines whether an effective (unmasked) DMA request exists and to which DMA channel the DACK# is to be returned.

(2) Generation of internal PCI bus access request

If there is an effective DMA request, ISA DMAC 1521 generates a REQ# to PBA 151. However, at this time, the DMA channel for granting the DACK# is not determined. Further, when internal PCI bus 2 is in a locked state, generation of REQ#s is suppressed.

(3) Acquisition of internal PCI bus access enable.

When ISA DMAC 1521 acquires GNT# from PBA 151, ISA DMAC 1521 examines whether internal PCI bus 2 is in a state of resource locking. When internal PCI bus 2 is in a state of resource locking, DACK# is not output. Moreover, GNT# is invalidated by making REQ # inactive.

(4) DACK # assert.

If the resource is not locked, ISA DMAC 1521 determines the DMA channel for granting the DACK#. The DACK# is returned to RGM 1522 and IIDR 1523. At the time when the DACK# is activated, the DMA channel is fixed. And, ISA DMAC 1521 keeps outputting bus access request REQ # until all necessary DMA transfer ends. Generally, PCI bus cycles are generated two or more times. Meanwhile, ISA DMAC 1521 does not release internal PCI bus 2, even if the bus cycles is ended by a target retry.

If internal PCI bus 2 is again in a state of resource locking at next target retry, ISA DMAC 1521 does not output DACK#, and invalidates GNT# by making REQ# inactive.

(5) Generation and repetition of bus cycles

ISA DMAC 1521 generates a bus cycle in internal PCI bus 2 from when the DACK# is asserted. However, when the selected DMA channel has been programmed in cascade mode, a bus cycle is not generated.

The types of bus cycle are classified as the three types of write transfer, read transfer and verify transfer by the content (transfer type) of a mode register of the selected DMA channel.

The write transfer operation (I/O read→memory write) is now specifically explained. The write transfer is executed by taking the following two bus cycles as one group and repeating them the necessary number of times.

DMA-exclusive I/O cycle (read) memory write cycle

The DMA-exclusive I/O cycle (read) is exactly the same as the I/O read cycle of a standard PCI bus. However, the I/O address has a special meaning.

The I/O address is either preferably one of:

00000000h: no TC
00000004h: TC exists

These addresses are allocated to 82C37 (DMAC), and no target other than ISA DMAC 1521 corresponds thereto. TC is a signal indicating the end of the transfer count value, i.e. transfer completion.

The agent which is an I/O target is a bridge having paths which have received a DACK#. For example, a DACK# has been granted to a DMA slave on external ISA bus 5 by means of a serial GNT#, PCI-DS bridge 16 device and EIBB 202 of DS-PCI/ISA bridge device 20 corresponding thereto.

PCI-DS bridge 16 outputs a command (IOR#) on external ISA bus 5. When the address specifies TC (00000004h), a TC is output to external ISA bus 5. At this time, a DACK# has already been output by EIDR 204. Consequently, external ISA bus 5 outputs read data from a DMA slave selected by the DACK#. PCI-DS bridge 16 sends this data from external ISA bus 5 to internal PCI bus 2.

The read data is latched by ISA DMAC 1521. This data is used as write data in the memory write cycle generated by ISA DMAC 1521 immediately afterward.

The memory write cycle is preferably the same as the memory write cycle of a standard PCI bus.

A memory address is made from a current address register and a page register incorporated in ISA DMAC 1521. ISA DMAC 1521 outputs write data latched by the DMA-exclusive I/O cycle (write) immediately prior thereto. In a single transfer, one byte (8 bit DMA) or two bytes (16 bit DMA) is/are generated.

Host-PCI bridge device 12, which is one target, corresponds in a similar manner as the memory write from the standard PCI master, and write accesses system memory 13. Even where finished due to a retry, ISA DMAC 1521 regenerates the same memory cycle after placing it on standby for a short time. During this time, ISA DMAC 1521 does not release internal PCI bus 2.

Moreover, in this embodiment of this invention, when ISA DMAC 1521 receives GNT# from PBA 151, ISA DMAC 1521 inquires to the resource lock detection logic device whether the PCI bus is in a state of the resource lock. However, before ISA DMAC 1521 issues REQ# to PBA 151, ISA DMAC 1521 inquires to the resource lock detection logic device as to whether the PCI bus is in a state of resource lock. And if the PCI bus is in a state of resource lock, it can prevent ISA DMAC 1521 from generating REQ#. In this case, since the transaction for DMA transfer is not executed, it can prevent the DMA transfer from malfunctioning in view of the generation of a target retry.

What is claimed is:

1. A computer system comprising:

a PCI bus on which a lock signal line indicating whether access to a resource is exclusively executed and a bus access request signal line and a bus access enable signal line are allocated to respective PCI agent devices;

bus arbiter means, connected to the PCI bus, for arbitrating bus accesses based on the bus access request signal line and the bus access enable signal line; and DMA controller means, connected to the PCI bus, for requesting bus access to the bus arbiter means, in response to a DMA transfer request from an I/O expansion device, and for executing a transaction for a direct memory access (DMA), in response to a reception of a bus access enable signal from the bus arbiter means;

wherein the DMA controller means includes:

resource lock detection means for determining whether the PCI bus is in a state of resource lock based upon the lock signal;

retry means for retrying the transaction after a predetermined time from when a target retry is informed by a target device on the PCI bus specified by an address during an execution period of the DMA transfer; and means for keeping the bus access request signal active so that the PCI bus is not released if the resource lock detection means determines that the PCI bus is not in a state of resource lock, when a target retry is sent from a target device.

2. The computer system of claim 1, wherein the resource lock detection means includes means for monitoring the lock signal on the PCI bus, and means for determining that the PCI bus is not in a state of resource lock, when the lock signal is inactive.

3. The computer system of claim 2, wherein the resource lock detection means includes means for monitoring the state of a frame signal on the PCI bus.

4. The computer system of claim 2, further comprising means for issuing a DMA acknowledge signal to an I/O device from which the DMA transfer is requested, when the bus access enable signal is granted.

5. The computer system of claim 4, wherein the DMA controller means includes means for making the bus access request signal inactive so that bus cycles on the PCI bus are not executed.

6. The computer system of claim 5, wherein the bus arbiter means includes means for invalidating the bus access enable signal allocated into the DMA controller means, when the bus access request signal is made inactive.

7. The computer system of claim 1, wherein the retry means includes means for determining whether a target retry from a target device is informed in accordance with a target ready signal (TRDY#), a stop signal (STOP#), and a device selection signal (DEVSEL#) on the PCI bus.

8. The computer system of claim 1, wherein the retry means includes:

means for determining whether the PCI bus is in a state of a resource lock by using the lock signal (LOCK#) after a predetermined time has passed since the target retry was informed; and means for retrying the transaction when the resource is not locked.

9. A computer system comprising:

a PCI bus on which a lock signal (LOCK #) line indicating whether access to a resource is exclusively executed and a bus access request signal (REQ#) line and a bus access right signal (GNT#) line are allocated into respective PCI agent devices;

a bus arbiter (PBA), connected to the PCI bus, for arbitrating bus accesses based on a bus access request signal (REQ#) line and a bus access enable signal (GNT#) line; and a DMA controller core, connected to the PCI bus, for requesting a bus access on the PCI bus to the bus arbiter by generating the bus access request signal (REQ#), in response to a DMA transfer request from each of I/O expansion devices, and for executing a transaction for a direct memory access (DMA), in response to a reception of the bus access enable signal (GNT#) from the bus arbiter;

wherein the DMA controller core includes:

resource detection means for determining whether the PCI bus is in a state of resource lock based on the lock signal;

means for outputting the bus access request signal (REQ#) so that the PCI bus is not released if the resource detection means determines that the PCI bus is not in a state of resource lock, when a target retry is sent by a target device on the PCI bus specified by an address during an execution period of the transaction for the DMA transfer; and means for processing the target retry after a predetermined time has passed.

10. The computer system of claim 9, wherein the DMA controller core includes means for making a bus access request signal inactive.

11. The computer system of claim 10, wherein the bus arbiter includes means for invalidating a bus access right signal (GNT#) granted to the DMA controller core.

12. A computer system comprising:

bus arbiter means for arbitrating accesses on a bus;

means for transmitting a bus access request signal from an I/O expansion device to the bus arbiter means;

means for receiving a granted bus access enable signal from the bus arbiter means;

means for determining whether the bus is in a state of resource lock based on a lock signal on the bus at the granted bus access enable signal;

means for keeping the bus access request signal active so that the bus is not released if it is determined that the bus is not in a state of resource lock, when a target retry is set from a target device on the bus specified by an address during execution of a transaction; and means for executing the transaction after a predetermined time has passed.

13. The computer of claim 12, wherein the prohibiting means includes means for preventing the generation of an acknowledge signal at the resource lock of the bus.

14. The computer system of claim 13, wherein the transaction includes a DMA transfer.

15. The computer system of claim 14, further comprising means for executing a transaction for a DMA transfer in response to the bus access request signal from the I/O expansion device.

16. A method of detecting a state of a resource lock using a controller on a bus, on which a lock signal line indicating whether access to a resource is exclusively executed and a bus access request signal line and a bus access enable signal line are allocated into each of agent devices on the bus, the method comprising the steps of:

transmitting a bus access request signal from an I/O expansion device through a bridge device to bus arbiter means;

receiving a granted bus access enable signal to the controller means by the bus arbiter means;

determining whether the bus is in a state of resource lock by using the lock signal at the granted bus access enable signal; and retrying the transaction after a predetermined time so that the bus is not released with the bus access request signal keeping active if it is determined that the bus is not in a state of resource lock, when a target retry is informed from a target device on the bus specified by an address during an execution period of the transaction.

17. The method of the claim 16, wherein the determining step includes the steps of:

monitoring the lock signal on the bus; and determining that the bus is not in a state of resource lock, when the lock signal is inactive.

18. The method of claim 17, wherein the determining step includes the step of monitoring the state of a frame signal on the bus.

19. The method of the claim 16, further comprising the step of issuing an acknowledge signal to I/O device from which a transfer is requested, when the bus access enable signal is granted.

20. The method of claim 16, further comprising the step of making the bus access request signal inactive by the controller means, when the resource lock is detected on the bus.

21. The method of claim 19, further comprising the step of invalidating bus access enable signal allocated into the controller means by the bus arbiter means, when the bus access request signal is made inactive.

22. The method of claim 16, wherein the retry step includes the step of determining whether a target retry from a target device is informed in accordance with a target ready signal, a stop signal, and a device selection signal on the PCI bus.

23. The method of claim 16, wherein the retry step includes the steps of:

determining whether the bus is in a state of a resource lock by using the lock signal after a predetermined time has passed since the target retry was informed; and retrying the transaction when the resource is not locked.

* * * * *